US006735843B2

(12) United States Patent

Campbell et al.

(10) Patent No.: US 6,735,843 B2
(45) Date of Patent: May 18, 2004

(54) SPIN PULL MODULE FOR THREADED INSERTS

(75) Inventors: Frederick A. Campbell, Webster, NY (US); Jesse J. Diehl, Spencerport, NY (US)

(73) Assignee: Meikle NY, Inc., Rochester, NY (US)

( * ) Notice: Subject to any disclaimer, the term of this patent is extended or adjusted under 35 U.S.C. 154(b) by 0 days.

(21) Appl. No.: 10/256,530

(22) Filed: Sep. 27, 2002

(65) Prior Publication Data

US 2003/0024100 A1 Feb. 6, 2003

Related U.S. Application Data

(63) Continuation of application No. 09/707,113, filed on Nov. 6, 2000, now Pat. No. 6,490,905.

(51) Int. Cl.[7] .......................... B23P 17/00; B23P 11/00

(52) U.S. Cl. ................................ 29/525.11; 29/243.53; 29/243.526; 72/391.8; 72/453.17

(58) Field of Search ......................... 29/525.11, 402.12, 29/402.14, 402.15, 428, 505, 509, 524.1, 525, 525.01, 525.05, 525.06, 34 B, 700, 712, 798, 243.53, 243.526; 72/391.8, 453.17; 228/114.5; 227/77, 110

(56) References Cited

U.S. PATENT DOCUMENTS 4,589,155 A 5/1986 Jeal
4,699,552 A 10/1987 Jeal
5,315,744 A * 5/1994 Denham et al. ......... 29/243.53
6,067,839 A * 5/2000 Xie .......................... 72/391.8
6,212,931 B1 * 4/2001 Solfronk .................... 72/391.8
6,272,899 B1 * 8/2001 Bentivogli ................. 72/391.8

FOREIGN PATENT DOCUMENTS

| | | | |
|---|---|---|---|
| CA | 2012152 | | 9/1990 |
| CA | 2144394 | | 9/1995 |
| CA | 2168197 | | 8/1996 |
| EP | 0 388 117 | | 9/1990 |
| EP | 0 674 109 | | 9/1995 |
| EP | 0 725 221 | | 8/1996 |
| GB | 2112893 | | 7/1983 |
| GB | 2299639 | | 10/1996 |
| GB | 2326908 | | 1/1999 |
| WO | WO 97/35117 | * | 9/1997 |

* cited by examiner

*Primary Examiner*—Peter Vo
*Assistant Examiner*—Stephen Kenny
(74) *Attorney, Agent, or Firm*—Michael L. Dunn

(57) ABSTRACT

A method and apparatus for installing a hollow threaded insert into a hole in a substrate having first and second surfaces. The insert has a hollow shaft having a first end portion, a second end portion and an intermediate portion. The insert has a front flange at the first end portion for engaging the front surface of the substrate around the hole. The second end portion of the shaft has an internal thread and, the intermediate collapses to engage the second surface when a force is applied that pulls the second end portion toward the first end portion.

11 Claims, 4 Drawing Sheets

SPIN PULL MODULE FOR THREADED INSERTS

This is a continuation application of U.S. Ser. No. 09/707,113, filed Nov. 6, 2000 which is now U.S. Pat. No. 6,490,905.

BACKGROUND OF THE INVENTION

This invention relates to methods and apparatus for installing threaded inserts into a substrate. Such substrates, for example, include films, sheets or plates that may be curved or flat. The substrates may be made of materials such as metal, wood, glass, ceramic, cellulose, leather or plastic and may be completely solid, or partly porous, e.g. in the form of textiles or foam. More particularly, the invention concerns an insert that has a hollow shaft having first and second end portions and an intermediate portion between the end portions and a flange surrounding the first end portion. The insert is installed by passing the intermediate portion and second end portion through a hole in the substrate to preferably, but not essentially, pass through a rear surface of the substrate so that the flange of the insert contacts a front surface of the substrate. The second end portion is then pulled toward the first end portion to collapse the intermediate portion of the shaft upon the rear surface of the substrate (or upon the sidewalls defining the hole in the substrate) to form a gripping structure that secures the insert.

Inserts, as described above, are well known. They are for example readily purchased at local hardware stores for insertion into drywall substrates. Such inserts have more recently been used in production processes to provide threaded structures in substrates that may not be strong enough by themselves to support reliable threads or to reduce production time by eliminating the need to thread individual holes in the substrates with taps.

The use in production has, however, been hampered by the lack of processes and equipment to rapidly and reliably install such inserts.

The first, and still most common, way to install such inserts is by placing the shaft through a hole in the substrate, as above described, and turning a threaded rod with an end flange, e.g. a bolt having a bolt head or flanged threaded mandrel or screw head, into the threads in the second end of the insert thus pulling the second end toward the first end of the insert to collapse the intermediate portion of the insert, as previously described.

Such a method of installation has numerous disadvantages. For example, when the threaded rod with its end flange is turned to collapse the intermediate portion, significant torque is required. The high torque tends to turn the entire insert which can result in a bad installation by causing the formation of a defective gripping structure, or destroying or damaging the substrate or even more commonly, causing failure of threads within the insert. Great care must therefore be taken to assure that the insert does not spin. This often requires that a separate insert retaining means be employed that can withstand the required high torque. Even in such cases, the failure to obtain a good installation is more frequent than can be tolerated by many, if not most, production systems.

More recently, such inserts have been installed in production systems by threading a mandrel into the insert and longitudinally pulling the second end of the shaft of the insert toward the first end of the shaft of the insert, without applying a rotational torque. Nevertheless, the apparatus and processes for accomplishing that result have not been as reliable as desired. In particular, in existing apparatus, when the mandrel was pulled, it was necessary to move the entire drive assembly with the mandrel thus preventing secure attachment of the drive to a cylinder housing for the piston providing the pulling force. As a result, the drive (motor) tended to at least partially move rotationally when it was activated creating wear and misalignment and preventing smooth rotational operation. Further when the drive was activated to rotate the drive shaft, due to wear, as previously described, unacceptably high friction resulted between the drive shaft and piston through which the shaft passed, wearing both the drive shaft and the race or bore through the piston accommodating the drive shaft. As a further result, the turning of the drive shaft tended to also rotate the piston creating wear in the piston seals. The same increase in friction caused an increase in torque requirements to overcome friction losses. All of these problems resulted in significant down time and potentially unsatisfactory installation of the insert. As an even further disadvantage of such apparatus and methods, there was no good way to detect when the screw head (e.g. threaded mandrel) was withdrawn to permit positioning of an insert for loading onto the screw head. There was also no good way to detect where the screw head was screwed into the insert so that the nose retainer contacted the flange of the insert or where the shaft of the insert was inserted into the substrate so that the insert flange contacted the first surface of the substrate or where the screw head had been completely unscrewed from the insert. Accurate use of detectors would have been hampered in such devices due to motion of the drive relative to the cylinder housing and also due to lack of a secure attachment of the drive, the tendency of the piston to rotate and undesirable wear, as previously described. Attempts to stop the piston from rotating themselves give a further wear point as the misalignments due to the insecurely attached drive permit rotational forces to be applied to the piston to be at least partly successful in causing piston rotation due to wear as previously described. The devices further did not lend themselves to safe placement of detectors, i.e. there was no good way for internal detecting mechanisms and the required undesirable movements previously described caused vibration of any sensors used.

BRIEF DESCRIPTION OF THE INVENTION

Figure 1:
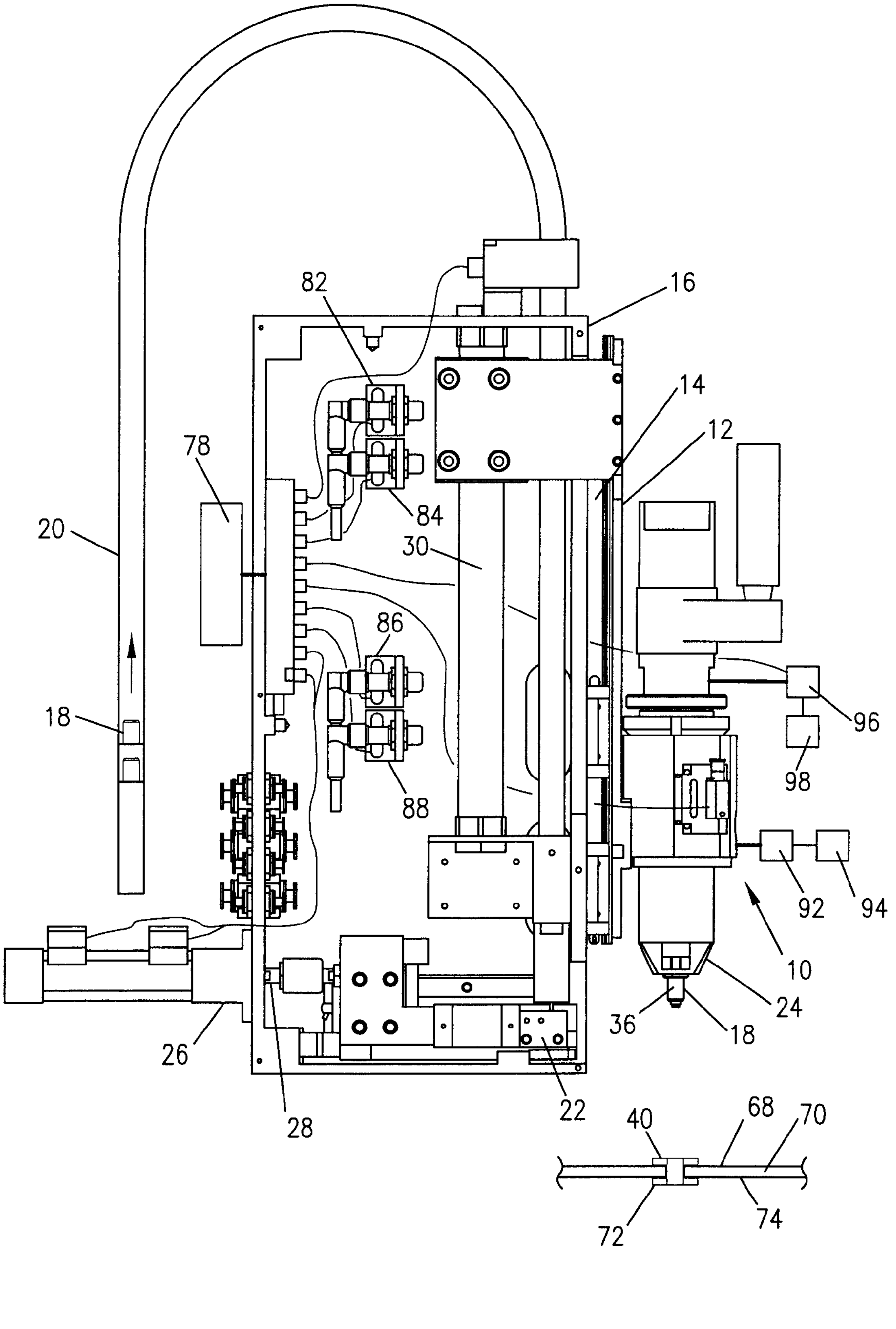
FIG. 1 is an elevational view of an apparatus in accordance with a preferred embodiment of the present invention where the insert gun of the invention is mounted on a frame.
Figure 2:
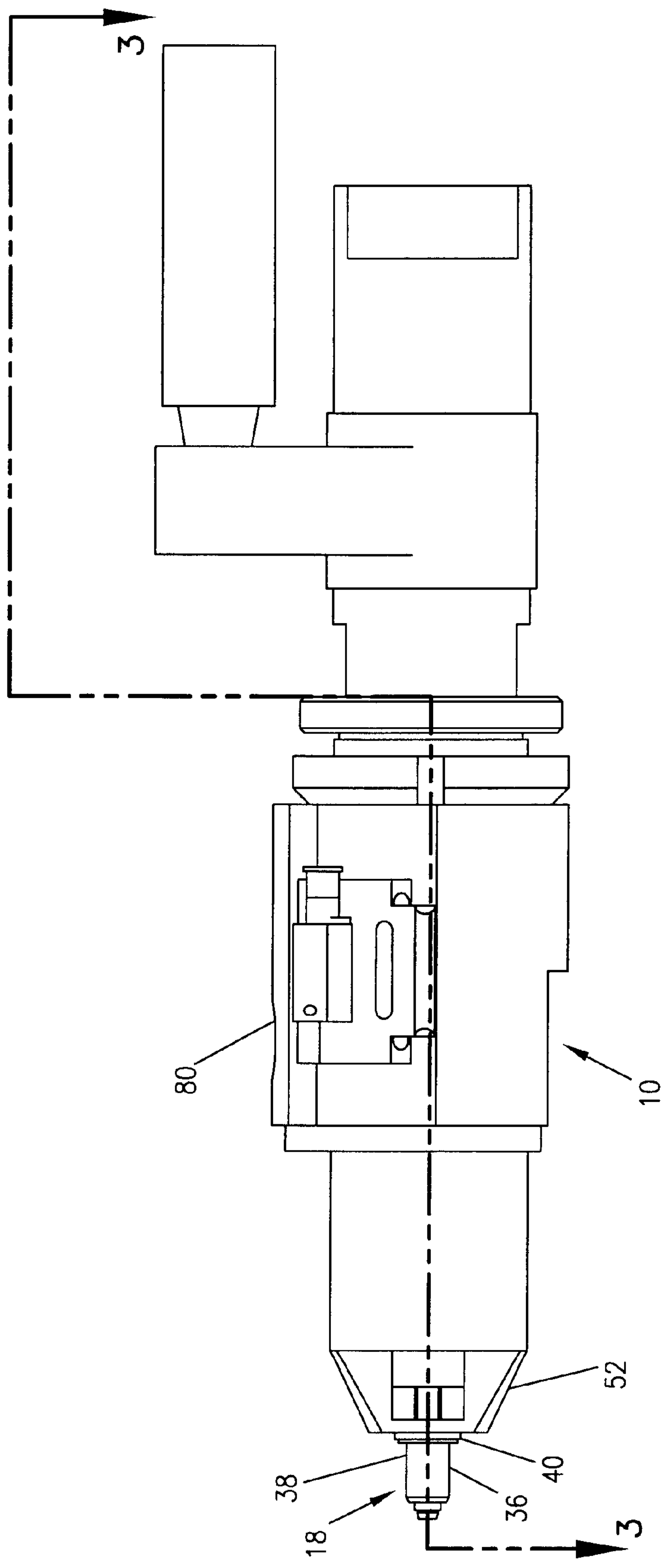
FIG. 2 is a side view of a preferred embodiment of an insert gun of the present invention.

In accordance with the invention there is therefore provided a method and apparatus that overcome or minimize the disadvantages of the methods and apparatus discussed above in the Background of the Invention. Particularly, the apparatus and method of the invention permit reduced apparatus wear, better and more reproducible results, verification of crimp force to collapse the insert to form the grip, confirmation of the collapsed dimension of the insert, and the verification of the presence of proper threads in the installed insert.

As already discussed, the insert to be used in accordance with the invention is a hollow threaded insert for placement into a hole in a substrate where the substrate preferably, but not essentially, has front and rear surfaces. The insert has a shaft with a first end portion, a second end portion and an intermediate portion between the first end portion and second end portion. The insert has a front flange at the first end portion of the shaft for engaging the first (front) surface of the substrate around the hole. The second end portion of the shaft has an internal thread. The intermediate portion includes a gripping means that engages the rear surface of the substrate; or in the case where the shaft of the insert does not pass through the hole, the side walls of the hole; when a force is applied that pulls the second end portion toward the first end portion.

In particular, the method includes the steps of:

- activating a rotatable drive having an attached drive shaft in turn having an attached externally threaded mandrel so that the threaded portion of the mandrel rotates into the hollow threaded portion of the insert through the flange until a nose retainer, through which the mandrel passes, contacts the flange of the insert;
- moving the drive, drive shaft, mandrel and attached insert to place the shaft of the insert into the hole in the substrate so that the flange of the insert contacts the first surface of the substrate;
- pulling the second end portion of the shaft of the insert toward the first end portion of the shaft of the insert by means of a pressure applied to a piston within a cylinder where the piston is connected to the drive shaft holding the mandrel so that the motion of the mandrel collapses the intermediate portion of the insert to grip the second (rear surface of the substrate, or the sidewalls of the hole), and so that the drive shaft moves in a compliant coupling toward the drive;
- turning the drive in a reverse direction to disengage the mandrel from the threads in the insert; and
- moving the mandrel, nose retainer, drive shaft and drive in a direction away from the flange of the installed insert.

The apparatus for installing a hollow threaded insert through a hole in a substrate includes a piston, a drive shaft, a cylinder, an externally threaded mandrel having threads that match the internal threads of the insert, a compliant coupling, a rotatable drive, and a nose retainer.

Structure is provided for moving the piston, drive shaft, cylinder, mandrel, compliant coupling, rotatable drive and nose retainer toward the flange of the insert so that the threads of the mandrel contact the threads of the insert and for moving the threads of the mandrel into the hollow portion of the insert through the flange so that the threads of the mandrel rotate into the threads within the hollow portion of the insert until the flange of the insert contacts the nose retainer. The structure for moving and rotating includes the drive shaft connected to the mandrel where the drive shaft is set into the compliant coupling to the rotatable drive.

Apparatus is provided for moving the mandrel with attached insert to place the insert shaft into a hole in the substrate so that the flange of the insert contacts the first (front) surface of the substrate and for pulling the second end portion of the insert toward the second (rear surface or hole sidewalls) surface of the substrate by applying pressure to the piston within the cylinder where the piston is connected to the drive shaft so that the intermediate portion of the insert collapses to grip the second) surface of the substrate and so that the drive shaft moves in the coupling toward the drive without moving the drive.

The drive is any suitable rotating drive, e.g. an electric or air motor that can be run in a reverse direction to disengage the screw head from the threads in the insert. Structure is also provided for moving the piston, drive shaft, cylinder, mandrel, slide coupling, rotatable drive and nose retainer away from the flange of the installed insert.

DETAILED DESCRIPTION OF THE INVENTION

The inserts for use in accordance with the present invention are as previously described. Such inserts are usually made from a metallic material, e.g. aluminum, steel, copper, or bronze, but may be made from certain plastics that are both flexible and rigid enough to form a permanent grip when the second end of the insert is drawn toward the second surface of the substrate, and strong enough to maintain threads that can withstand the torque and retaining ability required for a particular application. The first end of the insert frequently has a length about equal to the thickness of the substrate or slightly less. The intermediate portion of the insert shaft, that forms the grip, usually begins at about the rear surface of the substrate and extends to the threads at the second end when the shaft of the insert passes through the substrate.

As already discussed, the substrate may be made of many types of materials and is usually of a thickness of from about 0.5 nm to about 15 cm. The thickness of the substrate is most commonly from about 1 mm to about 10 mm. It is nevertheless to be understood that the invention is not necessarily limited by substrate thickness.

The rotatable drive is usually a hydraulically operated motor, e.g. a pneumatic air motor, but may be any suitable source for application of a rotational force, e.g. an electric motor.

The drive shaft is usually a steel rod that may be provided with bosses or shoulders for seals or retention. A first end of the drive shaft is adapted to be fitted to a variable coupling, as described infra, and the second end of the drive shaft is usually formed to accept a threaded mandrel so that the mandrel, which is a wear part, can be quickly replaced without disassembly of the apparatus of the invention to remove the drive shaft.

An important aspect of the present invention is the variable (or compliant) coupling that permits the first end of the drive shaft to be connected to the spindle of the drive while at the same time allowing the drive shaft to move toward and away from the drive without causing drive movement. Such a coupling also allows for at least some misalignment of the spindle and drive shaft without creating significant wear. Examples of such variable or compliant couplings are slide couplings and spring loaded couplings.

The apparatus for pulling the second end of the shaft of the insert includes a piston within a cylinder. The piston is biased toward the nose of the insert gun, e.g. with a spring. When the piston is forced in a direction away from the insert, e.g. by application of pressurized hydraulic fluid to the face of the piston sealed within a cylinder, the piston engages the drive shaft, that passes through the piston, and forces the drive shaft away from the insert thus pulling the second end of the insert shaft toward the rear surface of the substrate to cause the intermediate portion of the shaft to form a grip against the rear surface of the substrate. "Hydraulic", as used herein means the use of pressurized fluid to move a piston. The fluid may be either a liquid, e.g. an oil or a gas, e.g. air.

The entire gun assembly, i.e. cylinder, piston, drive, drive shaft, mandrel, variable coupling, and nose retainer, is moved in a slide on a frame using hydraulic, e.g. pneumatic, cylinders connected between the frame and a bracket holding the gun.

The invention may be better understood by reference to the drawings that show a preferred embodiment of the invention.

As seen in FIG. 1, insert gun 10 is mounted on bracket 12 that operates within a slide 14 on a frame 16. In operation inserts 18 are forced through a blow tube 20 to an oriented position in an insert gripper 22. The gripper 22 is then moved to a position beneath nose 24 by hydraulic cylinder 26 having its piston 28 interconnected to gripper 22, so that the mandrel can be lowered to engage the threads of an insert 18. The lowering of gun 10 is accomplished by hydraulic cylinder 30 connected between bracket 12 and frame 16.

Figure 3:
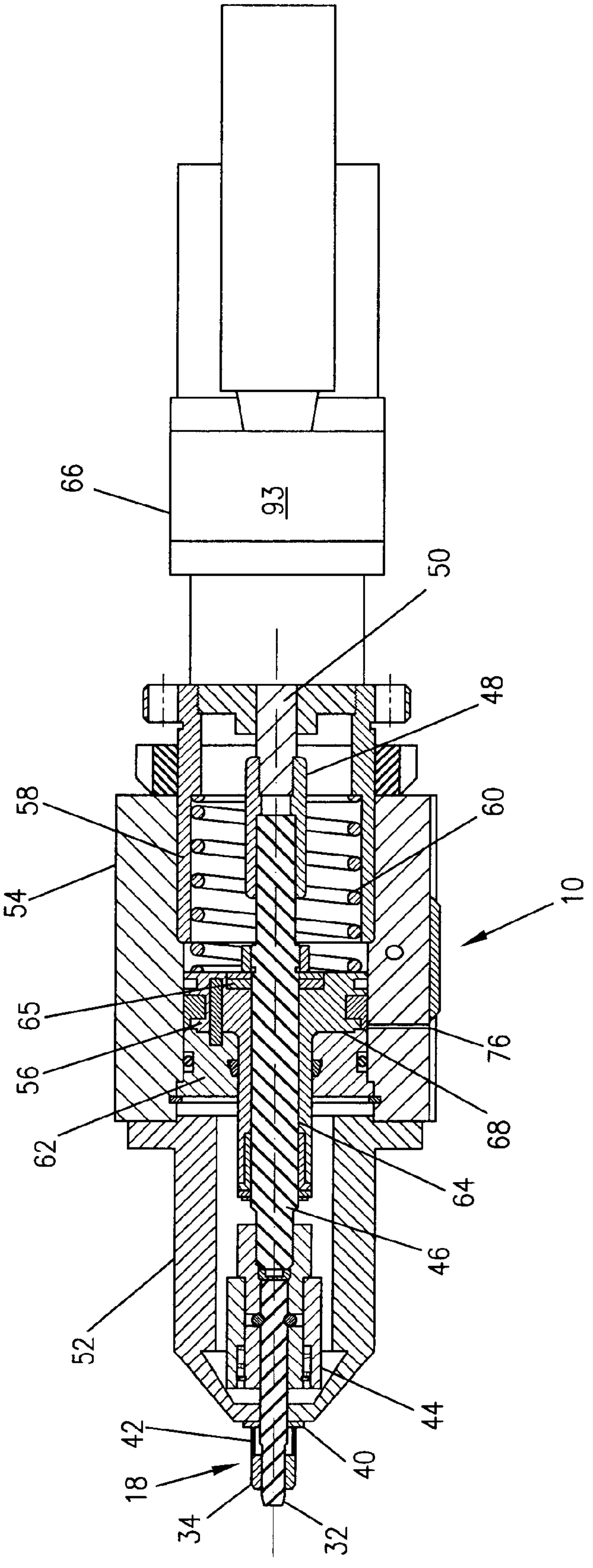
FIG. 3 is a cross sectional view of the gun of FIG. 2 taken on line 3—3 of FIG. 2.
Figure 4:
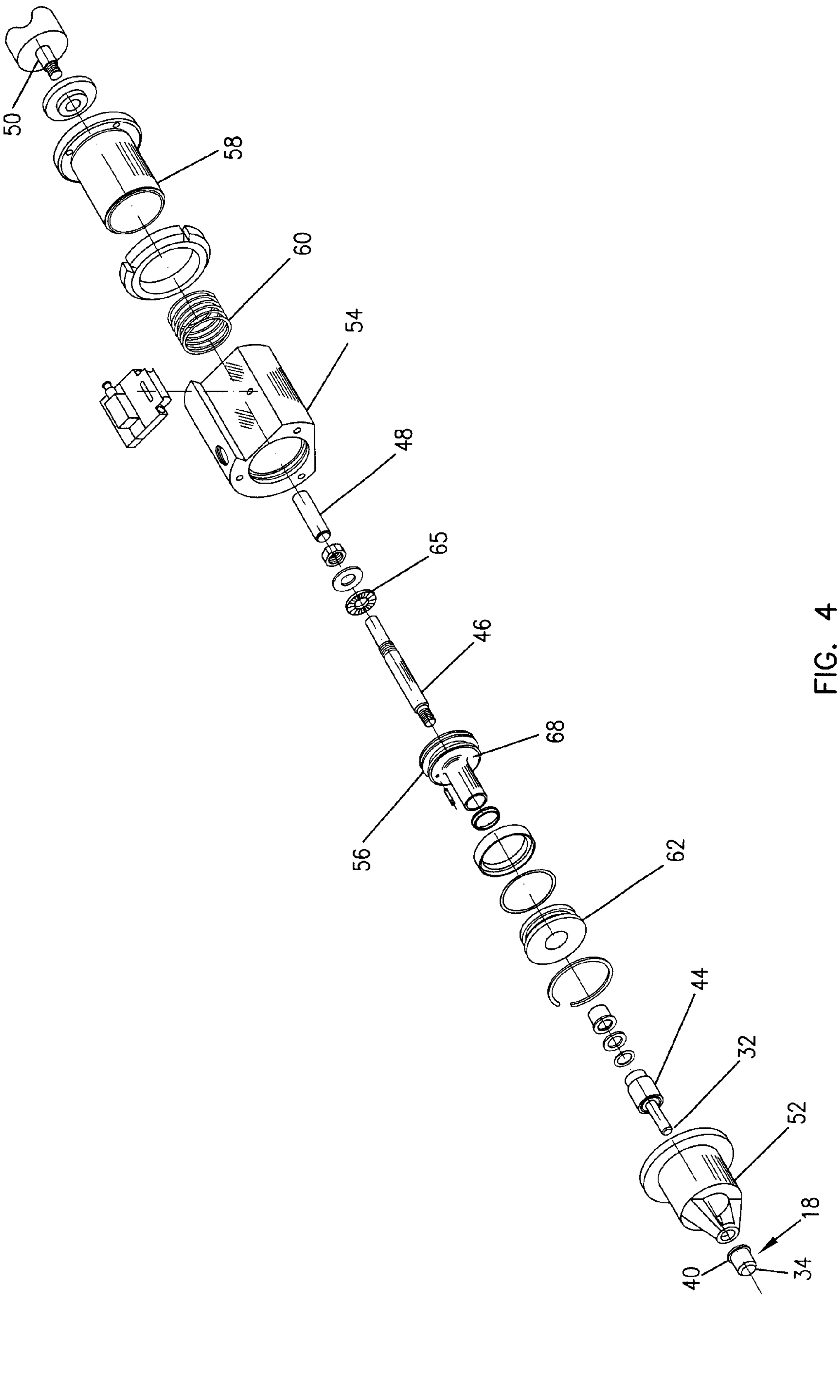
FIG. 4 is an exploded isometric view of the gun of FIG. 3.

The gun 10, whose component parts are best seen in FIGS. 3 and 4, includes a screw head (mandrel) 32 adapted to screw into the threaded second end 34 of the shaft 36 of the insert 18. Insert 18 further has a first end 38 surrounded by a flange 40 and has intermediate collapsible portion 42.

Mandrel 32 is readily replaceable and is held by chuck 44 attached to drive shaft 46. Drive shaft 46 is in turn connected to slide coupling 48 that is connected to drive spindle 50. Mandrel 32 is stabilized by nose 52 which also acts as a retainer against insert flange 40 when second end 34 is being pulled toward flange 40.

Gun 10 is further provided with a cylinder 54 and a piston 56 contained within the cylinder 54. Cylinder 54 includes spring retainer sleeve 58 for holding a spring 60 that biases piston 56 toward a cylinder front end cap 62. Piston 56 is provided with a through bore 64 permitting passage of shaft 46. Shaft 46 is free to rotate within bore 64 but is keyed to piston 56 so that longitudinal movement of piston 56 also longitudinally moves shaft 46. Preferably a thrust bearing 65 is provided to reduce friction with piston 56 when shaft 46 is rotated with respect to piston 56. This is especially true when a longitudinal force, e.g. the weight of drive 66, is applied to shaft 46 that increases friction with piston 56.

A drive 66 is provided that rotates spindle 50 when the drive is activated. Drive 66 is preferably an air motor operated by means of valve 96 controlling flow from air supply 98 but may also be another type of rotating drive such as an electric motor. The drive is securely attached to cylinder 54 by threading the front of drive housing 93 into sleeve 58. The housing of drive 66 does not move relative to cylinder 54. The slide coupling 48 permits longitudinal movement of drive shaft 46 relative to spindle 50 so that there is also no longitudinal movement of spindle 50 relative to cylinder 54 even when shaft 46 itself move longitudinally with respect to cylinder 54.

As previously discussed piston 56 has a central bore 64, and also has piston front surface 68 facing the screw head 32. The drive shaft 46 passes through and is retained by central bore 64 so that longitudinal movement of the piston 56 moves drive shaft 46 while permitting drive shaft 46 to rotate within bore 64.

Cylinder 54 housing piston 56 is rigidly connected to the drive 66 and slidably connected to frame 16 by slide 14 so that cylinder 54 can slide relative to frame 16 but cannot rotate relative frame 16.

The nose 52 is rigidly connected to cylinder 54. Nose 52 engages flange 40 of insert 18 to hold it against first surface 68 of substrate 70 when the second end of the insert shaft is pulled toward the first end of the insert shaft to form a grip 72 against second surface 74 of substrate 70.

A fluid inlet including port 76 in cylinder 54 is provided for permitting fluid under pressure to enter cylinder 54 and contact the front face 68 of piston 56 to push piston 56 and retained drive shaft 46 in a direction toward drive 66 and to cause drive shaft 46 to slide within coupling 48.

A fluid outlet is also provided to permit fluid to be released from cylinder 54 which may use the same port 76 as the fluid inlet. The direction of flow through port 76 is controlled by an external valve.

A control 78 is provided for controlling the operation of the apparatus in response to input from sensors 80, 82, 84, 86, and 88 forming part of control 78. Control 78 activates drive 66 for causing screw head 32 to screw into threaded portion 34 of insert 18. Control 78 then stops drive 18 and causes cylinder 54 to move in slide 14 relative to frame 16 along with gun 10 and the insert 18 held on the screw head 32 to insert the shaft 36 of the insert into the hole in substrate 70. The control 78 closes valve 92 permitting outlet from port 76 and causes fluid under pressure from reservoir 94 to enter cylinder 54 through port 76 to force screw head 32 attached to drive shaft 46 by coupling 44 toward drive 66 to cause the grip 72 of the insert 18 to engage second surface 74 of substrate 70. Control 78 stops fluid inlet into cylinder 54 and opens the outlet to relieve pressure in cylinder 54. Control 78 then causes drive 66 to activate in reverse to unscrew screw head 32 from now installed insert 18. Unscrewing from the insert verifies that the threads in the insert are undamaged. Control 78 then causes gun 10 to move relative to the frame in a direction away from the installed insert.

The sensors of the control 78 includes a piston position sensor 80 that may be a magnet moving with the piston and a magnetic field detector attached to the cylinder or may be a feeler switch. Other sensors are: sensor 82 for detecting when cylinder 54 is positioned relative to the frame in a positions where gun 10 (attached to bracket 12 by cylinder 54) is withdrawn to permit positioning of an insert for loading onto screw head 32; sensor 84 for detecting where the screw head 32 is screwed into the insert so that nose retainer 52 contacts flange 40 of the insert; sensor 88 for detecting where the shaft 18 of the insert is inserted into substrate 70 so that insert flange 40 contacts the first surface 68 of substrate 70 and sensor 86 for detecting where the screw head 32 has been unscrewed from the insert. Control 78 handles signals from the sensors and provides commands to operate pistons, inlet and outlet valve 90 and drive 66 using a programmed logic chip within control 78.

What is claimed is:

1. A method for installing a hollow threaded insert into a hole in a substrate having first and second surfaces where the insert has a hollow shaft having a first end portion, a second end portion and an intermediate portion between the first end portion and second end portion, the insert having a front flange surrounding the first end portion of the shaft for engaging the front surface of the substrate around the hole, the second end portion of the shaft having an internal thread and, said intermediate portion comprising a gripping means that engages the second surface when a force is applied that pulls the second end portion toward the first end portion; said method comprising:

activating a rotatable drive having a single attached drive shaft in turn having an attached externally threaded mandrel so that the threaded portion of the mandrel rotates into the hollow threaded portion of the insert through the flange until a non-rotatable nose retainer, through which the mandrel passes, contacts the flange of the insert;

moving the drive, drive shaft, mandrel and attached insert to place the shaft of the insert into the hole in the substrate so that the flange of the insert contacts the first surface of the substrate;

applying pressure to a piston within a cylinder where the piston has a central bore retaining the drive shaft that passes through the bore so that the applied pressure moves the drive shaft toward the drive so that the motion of the drive shaft and attached mandrel pulls the second end portion of the insert toward the second surface of the substrate and collapses the intermediate portion of the insert to grip the second surface of the substrate;

turning the drive in a reverse direction to disengage the mandrel from the threads in the insert;

moving the mandrel, nose retainer, drive shaft and drive in a direction away from the flange of the installed insert; and controlling foregoing steps of the method by means of a controller comprising a programmed logic chip that receives data from a plurality of sensors.

2. The method of claim 1 where the shaft of the insert is passed through he substrate and the second surface is a rear surface of the substrate.

3. The method of claim 1 wherein the sensors include at least one sensor for detecting distance of movement of the mandrel.

4. The method of claim 1 wherein the sensors include at least one sensor for detecting pulling force applied to the mandrel.

5. An apparatus for installing a hollow threaded insert into a hole in a substrate having first and second surfaces where the insert has a hollow shaft having a first end portion, a second end portion and an intermediate portion between the first end portion and second end portion, the insert having a front flange surrounding the first end portion of the shaft for engaging the front surface of the substrate around the hole, the second end portion of the shaft having an internal thread and, said intermediate portion comprising a gripping means that engages the rear surface when a force is applied that pulls the second end portion toward the first end portion; said apparatus comprising:

a piston;

a single drive shaft;

a cylinder;

an externally threaded mandrel having threads that match the internal threads of the insert;

a slide coupling;

a rotatable drive;

a non-rotatable nose retainer;

means for moving the piston, drive shaft, cylinder, mandrel, slide coupling, rotatable drive and nose retainer toward the flange of the insert so that the threads of the mandrel contact the threads of the insert;

means for moving the threads of the mandrel into the hollow portion of the insert through the flange so that the threads of the mandrel rotate into the threads within the hollow portion of the insert until the flange of the insert contacts the nose retainer, said means for moving and rotating comprising the drive shaft connected to the mandrel where the drive shaft is set into the slide coupling to couple it to the rotatable drive;

means for moving the mandrel with attached insert to place the insert shaft into a hole in the substrate so that the flange of the insert contacts the first surface of the substrate;

means for pulling the second end portion of the insert toward the second surface of the substrate by means of a pressure applied to the piston within the cylinder where the piston has a central bore retaining the drive shaft that passes through the bore so that the applied pressure moves the drive shaft in the slide coupling toward the drive so that the motion of the drive shaft and attached mandrel collapses the intermediate portion of the insert to grip the second surface of the substrate;

means for turning the drive in a reverse direction to disengage the screw head from the threads in the insert;

means for moving the piston, drive shaft, cylinder, mandrel, slide coupling, rotatable drive and nose retainer away from the flange of the installed insert; and means for controlling the means for moving the piston, the means for moving the threads of the mandrel, the means for moving the mandrel with attached insert, means for pulling and means for turning, comprising a programmed logic chip and data sensors.

6. The apparatus of claim 5 wherein the means for moving the piston, drive shaft, cylinder, mandrel, slide coupling, rotatable drive and nose retainer toward and away from the insert comprises a slide connecting the cylinder to a frame where the cylinder is in turn interconnected to the piston, drive shaft, mandrel, slide coupling, rotatable drive and nose retainer.

7. The apparatus of claim 6 where the means for moving the piston, drive shaft, cylinder, mandrel, slide coupling, rotatable drive and nose retainer toward and away from the insert includes hydraulic cylinders connected between the frame and a bracket holding the cylinder where the bracket operates within the slide.

8. The apparatus of claim 5 wherein the sensors include at least one sensor for detecting distance of movement of the mandrel.

9. The apparatus of claim 5 wherein the sensors include at least one sensor for detecting pulling force applied to the mandrel.

10. A method for installing a hollow threaded insert into a hole in a substrate having first and second surfaces where the insert has a hollow shaft having a first end portion, a second end portion and an intermediate portion between the first end portion and second end portion, the insert having a front flange surrounding the first end portion of the shaft for engaging the front surface of the substrate around the hole, the second end portion of the shaft having an internal thread and, said intermediate portion comprising a gripping means that engages the second surface when a force is applied that pulls the second end portion toward the first end portion; said method comprising:

activating a rotatable drive having an attached single drive shaft in turn having an attached externally threaded mandrel so that the threaded portion of the mandrel rotates into the hollow threaded portion of the insert through the flange until a non-rotatable nose retainer, through which the mandrel passes, contacts the flange of the insert;

moving the drive, drive shaft, mandrel and attached insert to place the shaft of the insert into the hole in the substrate so that the flange of the insert contacts the first surface of the substrate;

applying pressure to a piston within a cylinder where the piston has a central bore retaining the drive shaft that passes through the bore so that the applied pressure moves the drive shaft in a slide coupling toward the drive mandrel so that the motion of the drive shaft and attached mandrel pulls the second end portion of the insert toward the second surface of the substrate and collapses the intermediate portion of the insert to grip the second surface of the substrate;

turning the drive in a reverse direction to disengage the mandrel from the threads in the insert;

moving the mandrel, nose retainer, drive shaft and drive in a direction away from the flange of the installed insert; and controlling foregoing steps of the method by means of a controller comprising a programmed logic chip that receives data from a plurality of sensors.

11. An apparatus for installing a hollow threaded insert into a hole in a substrate having first and second surfaces where the insert has a hollow shaft having a first end portion, a second end portion and an intermediate portion between the first end portion and second end portion, the insert having a front flange surrounding the first end portion of the shaft for engaging the front surface of the substrate around the hole, the second end portion of the shaft having an internal thread and, said intermediate portion comprising a gripping means that engages the rear surface when a force is applied that pulls the second end portion toward the first end portion; said apparatus comprising:

a piston;

a single drive shaft;

a cylinder;

an externally threaded mandrel having threads that match the internal threads of the insert;

a coupling;

a rotatable drive;

a non-rotatable nose retainer;

means for moving the piston, drive shaft, cylinder, mandrel, coupling, rotatable drive and nose retainer toward the flange of the insert so that the threads of the mandrel contact the threads of the insert;

means for moving the threads of the mandrel into the hollow portion of the insert through the flange so that the threads of the mandrel rotate into the threads within the hollow portion of the insert until the flange of the insert contacts the nose retainer, said means for moving and rotating comprising the drive shaft connected to the mandrel where the drive shaft is set into the coupling to couple the drive shaft to the rotatable drive;

means for moving the mandrel with attached insert to place the insert shaft into a hole in the substrate so that the flange of the insert contacts the first surface of the substrate;

means for pulling the second end portion of the insert toward the second surface of the substrate by means of a pressure applied to the piston within the cylinder where the piston has a central bore retaining the drive shaft that passes through the bore so that the applied pressure moves the drive shaft and attached mandrel toward the drive so that the intermediate portion of the insert collapses to grip the second surface of the substrate and so that the drive shaft moves away from the substrate;

means for turning the drive in a reverse direction to disengage the screw head from the threads in the insert;

means for moving the piston, drive shaft, cylinder, mandrel, coupling, rotatable drive and nose retainer away from the flange of the installed insert; and means for controlling the means for moving the piston, the means for moving the threads of the mandrel, the means for moving the mandrel with attached insert, means for pulling and means for turning, comprising a programmed logic chip and data sensors.

* * * * *